(12) United States Patent
Assenbrunner et al.

(10) Patent No.: US 11,835,238 B2
(45) Date of Patent: Dec. 5, 2023

(54) COOKING APPLIANCE UNIT AND COOKING APPLIANCE BASE FRAME

(71) Applicants: RATIONAL Aktiengesellschaft, Landsberg am Lech (DE); RATIONAL International AG, Heerbrugg (CH)

(72) Inventors: Jakob Assenbrunner, Landsberg am Lech (DE); Markus Lingenheil, Landsberg am Lech (DE); Reinhard Wassmus, Landsberg am Lech (DE); Kevin Spalholz, Landsberg am Lech (DE); Simon Endres, Landsberg am Lech (DE)

(73) Assignees: RATIONAL AKTIENGESELLSCHAFT; RATIONAL INTERNATIONAL AG

(*) Notice: Subject to any disclaimer, the term of this patent is extended or adjusted under 35 U.S.C. 154(b) by 788 days.

(21) Appl. No.: 16/632,260

(22) PCT Filed: Jul. 5, 2018

(86) PCT No.: PCT/EP2018/068274
§ 371 (c)(1),
(2) Date: Jan. 17, 2020

(87) PCT Pub. No.: WO2019/015985
PCT Pub. Date: Jan. 24, 2019

(65) Prior Publication Data
US 2020/0166219 A1    May 28, 2020

(30) Foreign Application Priority Data
Jul. 17, 2017 (DE) ............... 10 2017 116 030.2

(51) Int. Cl.
*F24C 15/08*   (2006.01)
*B66F 7/22*    (2006.01)
*A47J 37/12*   (2006.01)

(52) U.S. Cl.
CPC ......... *F24C 15/086* (2013.01); *A47J 37/1276* (2013.01); *B66F 7/22* (2013.01)

(58) Field of Classification Search
CPC ....... A47J 37/1276; A47J 37/049; B66F 7/22; F24C 15/086; F24C 15/08
(Continued)

(56) References Cited

U.S. PATENT DOCUMENTS 1,118,471 A * 11/1914 Carlton ............... A47J 37/0814
                                                    99/336
1,310,495 A *  7/1919 Ford ................... A47J 37/1214
                                                    99/336
(Continued)

FOREIGN PATENT DOCUMENTS

CN    100588328 C  *  2/2010  ............... A23L 1/01
DE    2041873          3/1972
(Continued)

OTHER PUBLICATIONS

"_16632260, IP Summary Table 2023-02-01.pdf", ProQuest Search Summary Table, ip.com, Feb. 1, 2023. (Year: 2023).*
(Continued)

*Primary Examiner* — Steven B McAllister
*Assistant Examiner* — Daniel E. Namay
(74) *Attorney, Agent, or Firm* — HAYES SOLOWAY P.C.

(57) ABSTRACT

A cooking appliance unit has a movable cooking appliance base frame, by which the cooking appliance attached thereto is height-adjustable, more specifically as a function of the operating situation of the cooking appliance. The cooking appliance includes a controller which is configured to auto-
(Continued)

matically adjust the height of the cooking pan as a function of the operating situation.

20 Claims, 2 Drawing Sheets

(58) Field of Classification Search
USPC .......................................... 99/407, 393, 427
See application file for complete search history.

(56) References Cited

U.S. PATENT DOCUMENTS

| | | | | | |
|---|---|---|---|---|---|
| 3,026,790 | A | * | 3/1962 | Arvan | A47J 37/1219 |
| | | | | | 318/446 |
| 3,078,786 | A | * | 2/1963 | Arvan | A47J 37/1219 |
| | | | | | 99/336 |
| 3,225,681 | A | * | 12/1965 | Wells | A47J 37/1219 |
| | | | | | 99/410 |
| 3,242,849 | A | * | 3/1966 | Wells | A47J 37/1219 |
| | | | | | 99/336 |
| 3,273,488 | A | * | 9/1966 | Anetsberger | A47J 37/1219 |
| | | | | | 99/336 |
| RE26,672 | E | * | 9/1969 | Wilson et al. | A47J 27/0817 |
| | | | | | 292/259 R |
| 5,402,712 | A | * | 4/1995 | King | A47J 27/0817 |
| | | | | | 99/415 |
| 6,009,795 | A | * | 1/2000 | Werts | A47J 37/1219 |
| | | | | | 99/336 |
| 6,305,270 | B1 | * | 10/2001 | Wang | A47J 37/1219 |
| | | | | | 99/410 |
| 6,877,825 | B2 | | 4/2005 | Khosropour et al. | 312/198 |
| 9,572,421 | B2 | | 2/2017 | Klinke | A47B 9/04 |
| 10,244,896 | B2 | * | 4/2019 | Miyoshi | A47J 37/1219 |
| 2011/0114633 | A1 | * | 5/2011 | Niklasson | H05B 6/686 |
| | | | | | 219/704 |
| 2012/0073453 | A1 | | 3/2012 | Choi | 99/443 R |
| 2014/0023755 | A1 | * | 1/2014 | Claesson | A47J 37/049 |
| | | | | | 99/372 |
| 2018/0160853 | A1 | * | 6/2018 | Miyoshi | A47J 37/1219 |

FOREIGN PATENT DOCUMENTS

| | | | | |
|---|---|---|---|---|
| DE | 3411564 A1 | * | 10/1985 | A47J 27/14 |
| DE | 100 05 003 | | 4/2000 | |
| DE | 103 25 303 | | 4/2003 | |
| DE | 20 2012 003 767 | | 4/2012 | |
| EP | 0401465 | | 12/1990 | |
| EP | 1125534 | | 8/2001 | |
| EP | 1125534 B1 | * | 11/2005 | A47J 36/12 |
| EP | 2695551 | | 2/2014 | |
| GB | 2375168 | | 11/2002 | |
| JP | 2018093905 A | * | 6/2018 | A47J 37/1219 |

OTHER PUBLICATIONS

International Preliminary Report on Patentability issued in application No. PCT/EP2018/068274, dated Jan. 21, 2020 (15 pgs).
International Search Report and Written Opinion issued in application No. PCT/EP2018/068274, dated Oct. 5, 2018 (20 pgs).
German Search Report issued in corresponding German Patent Application Serial No. 10 2017 116 030.2, dated Apr. 11, 2018 with machine translation (17 pages).

* cited by examiner

COOKING APPLIANCE UNIT AND COOKING APPLIANCE BASE FRAME

BACKGROUND OF THE INVENTION

The invention relates to a cooking appliance unit and a cooking appliance base frame for a cooking appliance having at least one heatable pan.

Such cooking appliances having at least one pan are on the market under the name VarioCooking Center® of the Applicant. The pan can be used to prepare a variety of foods to be cooked, whether soups or other foods to be cooked, deep-fried or fried or roasted, i.e. generally "to be cooked". The pan or pans may be closed with associated covers, which are adapted to be swiveled manually and/or by motor.

Professional chefs or cooks work with such cooking appliances all day long, so that it is decisive for a manufacturer of cooking appliances to give the chefs and cooks as much assistance as possible through easy handling and ergonomic optimizations.

The object of the invention is therefore to provide a cooking appliance unit and a cooking appliance base frame that meet these requirements.

SUMMARY OF THE INVENTION

The above object is achieved by a cooking appliance unit including a cooking appliance base frame which includes a lifting system having at least one drive, by means of which the cooking appliance base frame is height-adjustable, for varying the pan height above the floor, and including a cooking appliance supported by the cooking appliance base frame and having at least one heatable pan, and including a controller for vertically adjusting the cooking appliance base frame, wherein the controller is configured to automatically adjust the height of the pan as a function of the operating situation.

The "pan height" is measured from the floor, on which the cooking appliance base frame stands, to the upper edge of the pan with the pan set horizontally ("set" means if it is swivel-mounted). If the cooking appliance base frame is positioned on a table, the "pan height" is likewise measured from the floor on which the table is positioned, to the upper edge of the pan.

The controller is configured and programmed, for example, to vertically adjust the cooking appliance base frame as a function of the operating situation of the cooking appliance.

The term "operating situation" covers a number of notions. For example, the operating mode (e.g., roasting or frying, deep-frying, cooking, pressure cooking) is an operating situation, as is a cooking path phase. A cooking path phase is understood to mean, for example, the loading, the cooking itself, but also the emptying of a pan. Various cooking sequences may be stored in the controller of the cooking appliance, each of which may include cooking path phases that may even run fully automatically.

One idea of the present invention resides in that the cooking appliance base frame automatically moves vertically as a function of the operating situation and thus adjusts the vertical height of the pan. For example, it may make sense for ergonomic reasons to position the pan very high when frying, but rather low when cooking because, for ergonomic reasons, turning the food being cooked is better done in a higher pan position than stirring during cooking. Also, when deep-frying, where deep-flyer baskets having a relatively large depth are inserted and removed, the pan position is rather low, usually lower than during pressure cooking.

This cooking appliance unit may comprise one structural unit of the base frame and the cooking appliance or, optionally, two structural units, namely the base frame and the cooking appliance, which can optionally be coupled together in terms of control, but can also be uncoupled again.

Also, during the cooking path phases, possibly additionally as a function of the operating mode, vertical adjustment of the pan may be advantageous. During loading, for example, a low pan position is of advantage, possibly depending on the food to be cooked or the operating mode, whereas a higher pan position is advantageous during cooking. The end of the cooking process may possibly require a different vertical pan position again, which is also possibly dependent on the operating mode and the food to be cooked. For example, at the end of the cooking process when cooking a soup, the pan can be lowered because it is subsequently tilted downwards, while a higher position may be advantageous when removing noodles, just as when removing fried food.

The at least one pan may be adapted to be swiveled by motor and/or manually, which allows easy and quick emptying.

Furthermore, for opening the pan, that is, for swiveling an optionally provided cover, it may already be stored in the controller that to this end the pan position is lower than during the cooking process itself. The same applies to closing the pan and swinging down the cover. Cooks who may possibly have difficulty reaching the handle of the raised cover are now assisted in an optimum fashion.

Also, the controller may be configured to adjust the height of the pan as a function of the pan angle. When, for example, the pan is swiveled downwards for unloading, a pan height may be stored that reduces spilling or splashing of the cooked food and ensures a lowest possible height of fall of the cooked food. It may be provided here that the base frame is moved downwards before or during swiveling of the pan.

At least for some of the following operating situations, specific vertical heights for the pan may optionally be stored in the controller:

loading the pan with food to be cooked;
cooking the food to be cooked, including roasting or frying (especially also turning the food to be roasted or fried) or deep-frying or cooking or pressure cooking the food to be cooked (here optionally also differently depending on the operating mode);
tilting the pan for emptying;
cleaning the pan;
cooking by means of an accessory part (e.g., deep-fryer basket) that can be inserted in the pan;
positioning an accessory part (e.g. oil trolley or transport trolley) that can be moved up to the cooking appliance unit; and
opening and closing the cover.

Of course, identical pan heights may be provided for some of these operating situations, but there are also operating situations in which other pan heights are moved to automatically.

Generally, depending on the desired degree of automation, vertical adjustment may be performed automatically (e.g. in the case of a stored cooking process from loading to unloading) or initiated by a "push of a button" by the operator. For example, symbols may possibly be stored for the various operating situations, or different height positions may be stored (e.g. abbreviated by 1, 2, 3, 4, etc.), which the operator can select by only tapping on them, which then causes the height to be adjusted. For a given cooking path, for example, it can be predefined that after one of the cooking path phases the operator first presses a "button" in order that the pan is again moved to the preset next vertical position, which is already stored.

Since the respective operating unit now consists mainly of touch screens, there are hardly any more individual keys or buttons, so that the term "button" is used as a placeholder for an operating surface.

The controller may further be configured such that individual pan heights can be stored in it by means of a permanently provided operating unit for operating situations, including cooking path phases. This enables the operator to set his or her individual preferences regarding the pan height for the various operating situations for himself or herself. The operator identifies himself or herself at the start of his or her work at the cooking appliance unit, and the cooking appliance unit then operates with the data applicable to him or her with regard to the pan height.

In addition or instead, the controller may also be configured such that Individual pan basic heights and/or, as already mentioned, individual pan heights for different operating situations can be stored in it by means of a permanently provided operating unit. In the simplest variant, therefore, a user's pan basic height, i.e. his or her basic position in the vertical direction, is defined for each individual user. In the simplest embodiment of the cooking appliance unit according to the invention, only the pan basic height is individually set, i.e. an initial height or basic position measured in the vertical direction from the floor to the pan edge. Starting from this pan basic height, the operator can then move the pan individually, or vertical travel distances for particular operating situations are defined and can be traveled.

In a more luxurious variant, various user profiles with different pan heights, in particular for the various operating situations, can be stored in the controller.

The controller for adjusting the height of the pan may double as controller for the cooking processes, taking over this task as well.

The object is further achieved by a cooking appliance base frame for a cooking appliance having at least one swivel-mounted and heatable pan, characterized by a lifting system having at least one drive, by means of which the cooking appliance base frame is height-adjustable, for varying the pan height above the floor, and a top side of the cooking appliance base frame onto which the cooking appliance can be placed, the cooking appliance base frame being a structural unit separate from the cooking appliance.

The cooking appliance base frame according to the invention provides a height adjustment for the separate pan that can be placed on the base frame, so that the total height of the pan can be adjusted and the pan can thus be operated more ergonomically.

An optionally provided communication interface on the cooking appliance allows the cooking appliance base frame and thus the lifting system to be electronically coupled to the controller of the cooking appliance. This communication interface may be configured as a plug connection and allows the cooking appliance to be exchanged or else the cooking appliance base frame to be exchanged and coupled to a different cooking appliance. With this option, the controller of the cooking appliance will either also take over the control of the lifting system or is coupled to the controller of the lifting system.

The drive may comprise an electric motor drive or a hydraulic or pneumatic drive. Depending on this, one or more drives may be provided, but of course electric motor drives and/or hydraulic and/or pneumatic drives may also be provided.

At least one guide in the base frame ensures that an upper part of the cooking appliance base frame is vertically displaceable in relation to a floor-side part. Such a guide may be, for example, a linear guide or some type of lazy tongs linkage, or may also be coupled to the drive, for example via a gear drive or spindle drive.

An operating unit on the cooking appliance base frame is provided for activating and deactivating the drive. Of course, optionally, operation of the cooking appliance base frame may also be achieved via the communication Interface (if provided) using the operating unit of the cooking appliance.

The cooking appliance base frame according to the invention or the cooking appliance base frame for the cooking appliance unit according to the invention may also have a plurality of drives that are traversed unsymmetrically, to achieve e.g. the following characteristics. For instance, in the case of drives arranged one behind the other, the entire pan or the entire base frame can be tilted slightly forward by the rear drive(s) being moved further up than the front drive(s). This assists the so-called tipping movement of the pan. Furthermore, with laterally offset drives, one side can be moved vertically differently from the other side. With the individually adjustable drives, a floor leveling can also be achieved in addition to height adjustment. If a floor is uneven, the pan on the base frame may be leveled, i.e. oriented to be exactly horizontal. This may optionally also be effected fully automatically using a built-in electronic spirit level. Finally, a plurality of drives may also be provided to allow a plurality of existing pans arranged side by side to be individually adjusted vertically.

Further features and advantages of the invention will be apparent from the following description of the embodiments.

DETAILED DESCRIPTION OF THE INVENTION

Figure 1:
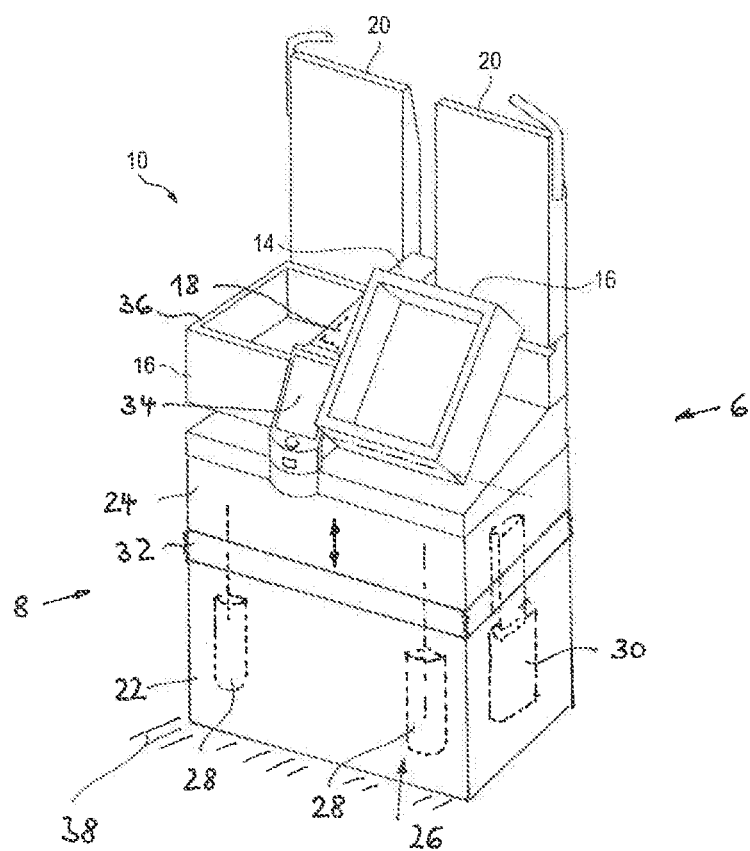
FIG. 1 shows an embodiment of a cooking appliance unit according to the invention.

FIG. 1 illustrates a cooking appliance unit 6, with a cooking appliance base frame 8 and a cooking appliance 10, which forms a structural unit with the cooking appliance base frame 8.

The cooking appliance 10 comprises a central bridge 14, on each side of which a respective swivel-mounted pan 18 is attached. The right-hand pan 16 is depicted tilted forward in an emptying position, white the left-hand pan 16 is depicted in a horizontal position, in which a cooking operation takes place. For example, in the area of the central bridge 14, a controller 18 for the entire cooking appliance unit 6 is accommodated in the interior of the central bridge.

Each pan 16 can be closed by its own swiveling cover 20; the opening and closing movements may be performed manually and/or by motor. The pans 16 are swiveled by motor.

The cooking appliance base frame 8 is height-adjustable by motor and comprises a floor-side part 22 and an upper part 24 which is vertically adjustable in relation to the floor-side part and is firmly connected to the cooking appliance 10 or forms part of it.

The height adjustment is effected by means of a lifting system 26, which is accommodated in the interior of the base frame 8 and comprises, for example, a plurality of electric-motor, hydraulic and/or pneumatic drives 28, which are attached to the floor-side part 22, on the one hand, and to the upper part 24, on the other hand.

In addition to the drives, one or more guides 30 may be provided, for example linear guides, to hold the upper part 24 relative to the lower part 22 laterally during vertical displacement.

Only by way of example, FIG. 1 illustrates a bellows 32 between the parts 22, 24, which covers the variable gap that occurs during height adjustment.

Of course, a housing of the upper part 24 may also protrude around a section of the lower part 22 to allow a gap-free adjustment. In any case it is ensured that there is no risk of injury to the operator.

Also, the cooking appliance base frame 8 need not, of course, have a box-shaped base frame as shown in FIG. 1; there may also be provided a frame with a narrow central column or two lateral feet or the like or a rear wall which allows adjustment and mechanically couples the two parts 22, 24 to each other.

The controller 18 is coupled to the drives 28 to activate or deactivate them in a controlled manner. An operating unit 34, here in the form of a touch screen, is coupled to the controller 18.

The cooking appliance 10 can be used to implement various operating modes such as, e.g., frying, deep-frying, cooking, pressure cooking, etc.; for this operating mode, different cooking path phases are either stored in the controller or can be initiated one after the other by the operator.

Various cooking processes which the cooking appliance 10 carries out automatically are also stored in the controller 18. Cooking path phases are, for example, loading, cooking, possibly in several stages, unloading or emptying, and cleaning the pans 16.

These operating modes and cooking path phases constitute operating situations. Depending on one or more operating situations, the height of the pans 16 can be and is automatically set and adjusted. The following non-exhaustive examples are explained in this context.

Stored in the controller 18 are individual pan heights that are specific to the different operating modes and, if required, partly individual or individual for each operating mode. This may alternatively or additionally also apply to individual cooking path phases or all cooking path phases. If the operator selects deep-frying, for example, the pans 16 are moved to a very low position by means of the drives 28 for loading purposes, so that an accessory component, e.g. a deep-fryer basket, can be inserted into the pans 16 as easily as possible, even for short users.

Subsequently, during deep-frying, the cooking appliance base frame 8 is moved up to give the operator a better view of the food to be cooked and allow him or her to grasp and shake the deep-fryer baskets more easily. At the end of the deep-frying process, the cooking appliance base frame is then moved back to a low position, which may be either the loading position or below or slightly above it.

The individual cooking path phases can either be called up individually by the operator, or they are executed one after the other through stored cooking processes with successively running cooking path phases.

The controller is thus configured to automatically adjust the height of the pans 16 as a function of the operating situation.

Specific vertical heights for the pans 16 (the so-called pan heights) are stored in the controller 18 for at least some of the following operating situations:
- loading the pans 16 with food to be cooked;
- cooking the food to be cooked;
- tilting the pans 16 for emptying;
- cleaning the pans;
- cooking by means of an accessory part, such as the above-mentioned deep-fryer basket, that can be placed in at least one pan 16;
- positioning an accessory part that can be moved up to the cooking appliance unit 6; and
- opening and closing the cover.

The approach of the accessory component can be detected, for example, by the accessory part containing an RFID chip that can be detected by the cooking appliance unit 6, so that as from its detection the cooking appliance is moved to the appropriate height. This allows, for example, an oil trolley to be moved up and the pans 16 are then brought to the pre-programmed height automatically or after the operating unit 34 has been appropriately touched.

The pan height is measured from the upper edge 36 of the pan 16 to the floor 38.

The controller 18 is configured such that an operator can store individual pan heights using the operating unit 34 for operating situations, e.g. for the operating modes and/or the cooking path phases. These pan heights can also be set individually for each operator separately, adjusted to his or her body height or to his or her preferences for carrying out specific activities at particular pan heights.

Individual, so-called pan basic heights can also be stored for different users, starting from which, for example, the pan height can be individually adjusted.

The pan heights can be stored individually for different users, including for operating modes and/or cooking path phases. In this way, each user can create and save his or her profile for the pan heights as a function of operating modes and/or cooking path phases.

Depending on the user, there may be preferences, for example, as to which height should be used for which cooking process or how the pan heights should be varied in a cooking process.

Figure 2:
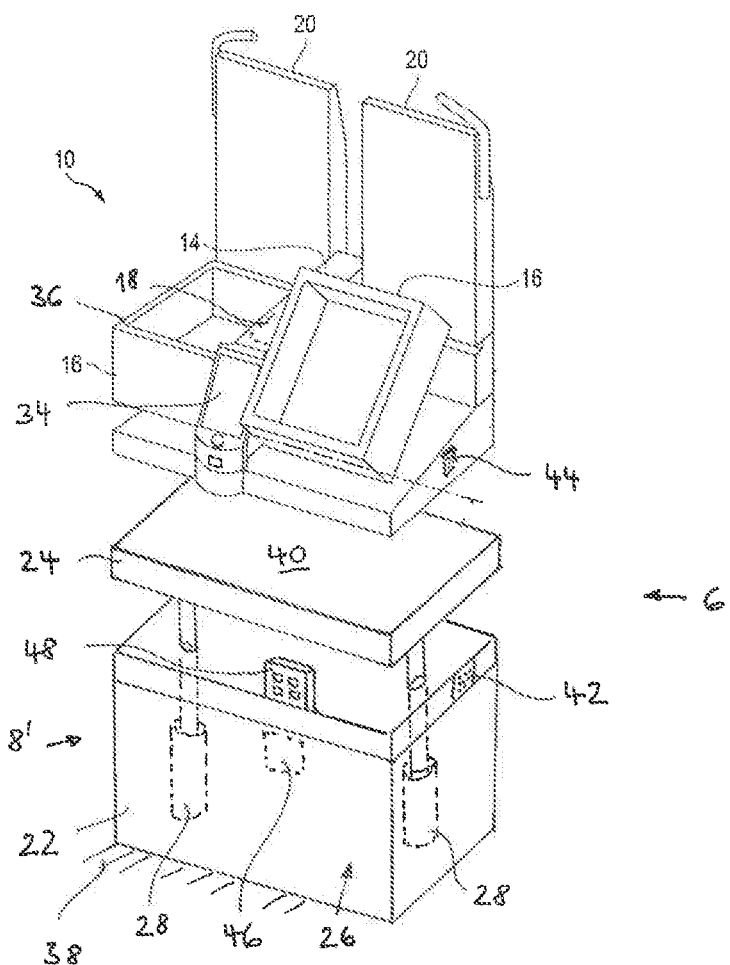
FIG. 2 shows an embodiment of a cooking appliance base frame according to the invention with a cooking appliance that can be positioned thereon to form a cooking appliance unit according to the invention.

The embodiment according to FIG. 2 shows a cooking appliance base frame 8' for a cooking appliance 10, which can be placed on a top side 40 of the upper part 24 and can be released from it again. The cooking appliance 10 and the cooking appliance base frame 8' are structurally separate units here.

The overall mode of operation may be similar to or the same as that of the cooking appliance unit according to FIG. 1, which has been discussed above.

The cooking appliance base frame 8' has an electronic communication interface 42, via which, for example by way of a cable or cables, a control-related communication with the cooking appliance 10 can take place. The cooking appliance 10 has an appropriate communication interface 44.

Using these communication interfaces 42, 44, it is theoretically possible to actuate the lifting system 26 by means of the controller 18, as described above.

Alternatively to this, the cooking appliance base frame 8' has its own controller 46, as well as its own operating unit

48, which alone could be used to adjust the height of the top side 40 to adjust the cooking appliance 10. In this case, two operating units 34, 48 are provided.

In the embodiment according to FIG. 2, the guides 30 may possibly be integrated in the drives 28, as is indicated in FIG. 2, so that separate guides 30 are no longer absolutely necessary.

Furthermore, in the cooking appliance unit 6 according to FIG. 1 and the cooking appliance base frame 8 according to FIG. 2, it may be programmed in the controller 18 that the pan height is set as a function of the pan angle. To empty a pan 16, the cooking appliance base frame 8 will then move down automatically, for example in this case to a predefined position.

If it is intended to make the pans 16 individually height-adjustable, they are not swivel-mounted to a central bridge 14, but to a bridge of their own, which then has one or more separate drives 28 that can be moved independently of the drive or drives of the other bridge.

The invention claimed is:

1. A cooking appliance unit comprising a cooking appliance base frame including a lifting system having at least one drive, by which the cooking appliance base frame is height-adjustable, for varying the pan height above the floor, and comprising a cooking appliance supported by the cooking appliance base frame and having at least one heatable pan, and a controller fir vertically adjusting the cooking appliance base frame, wherein the controller is configured to automatically vertically adjust the cooking appliance base frame so as to adjust the height of the pan as a function of the operating situation.

2. The cooking appliance unit according to claim 1, wherein the base frame and the cooking appliance form a structural unit.

3. The cooking appliance unit according to claim 1, wherein the controller is configured to vertically adjust the cooking appliance base frame as a function of the operating situation in the form of the operating mode of the cooking appliance.

4. The cooking appliance unit according to claim 1, wherein the controller is configured to vertically adjust the height of the cooking appliance base frame as a function of the operating situations in the form of cooking path phases.

5. The cooking appliance unit according to claim 4, wherein the controller is configured such that individual pan heights can be stored in it by a permanently provided operating unit for operating situations.

6. The cooking appliance unit according to claim 5, wherein the controller is configured such that individual pan basic heights and/or for different users can be stored in it by a permanently provided operating unit.

7. The cooking appliance unit according to claim 1, wherein the at least one pan is swivel-mounted.

8. The cooking appliance unit according to claim 7, wherein the controller is configured to adjust the height of the pan as a function of the pan angle.

9. The cooking appliance unit according to claim 8, wherein the controller is programmed such that the pan is moved downward tier emptying the pan by tilting it downward.

10. The cooking appliance unit according to claim 7, wherein the controller is programmed such that the pan is moved downward for emptying the pan by tilting it downward.

11. The cooking appliance unit according to claim 1, wherein specific vertical heights for the pan are stored in the controller at least for one of the following operating situations:
   loading the pan with food to be cooked;
   cooking the food to be cooked;
   tilting the pan for emptying;
   cleaning the pan;
   cooking employing an accessory part inserted into the pan;
   positioning an accessory part that can be moved up to the cooking appliance unit; and
   opening and closing the cover.

12. The cooking appliance unit according to claim 1, wherein the controller is configured such that different user profiles with different pan heights can be stored in it.

13. The cooking appliance unit according to claim 1, wherein the controller for adjusting the height of the pan is also the controller for the cooking processes.

14. A cooking appliance base frame for a cooking appliance having at least one heatable pan, comprising a lifting system having at least one drive, by which the cooking appliance base frame is height-adjustable, for varying the pan height above the floor, and a top side of the base frame onto which the cooking appliance can be placed, the cooking appliance base frame being a structural unit separate from the cooking appliance so that the cooking appliance can be placed into the top side of the base frame, and wherein the cooking appliance base frame has a plurality of independently movable drives.

15. The cooking appliance base frame according to claim 14, comprising a communication interface with the cooking appliance, via which the lifting system can be electronically coupled to the controller of the cooking appliance.

16. The cooking appliance base frame according to claim 15, wherein the at least one drive is an electric motor drive or a hydraulic or pneumatic drive.

17. The cooking appliance base frame according to claim 15, wherein at least one guide is provided by which an upper part of the base frame is vertically displaceable in relation to a floor-side part.

18. The cooking appliance base frame according to claim 14, Wherein the at least one drive is an electric motor drive or a hydraulic or pneumatic drive.

19. The cooking appliance base frame according to claim 14, wherein at least one guide is provided by which an upper part of the base frame is vertically displaceable in relation to a floor-side part.

20. The cooking appliance base frame according to claim 19, wherein an operating unit by which the drive can be activated and deactivated.

* * * * *

UNITED STATES PATENT AND TRADEMARK OFFICE
CERTIFICATE OF CORRECTION

| | |
|---|---|
| PATENT NO. | : 11,835,238 B2 |
| APPLICATION NO. | : 16/632260 |
| DATED | : December 5, 2023 |
| INVENTOR(S) | : Assenbrunner et al. |

It is certified that error appears in the above-identified patent and that said Letters Patent is hereby corrected as shown below:

In the Claims

Claim 1, Column 7, Line 24, "varying the pan height" should be --varying a pan height--.
Claim 9, Column 7, Line 59, "downward tier emptying" should be --downward for emptying--.

Signed and Sealed this
First Day of October, 2024

Katherine Kelly Vidal
*Director of the United States Patent and Trademark Office*